Figure 1:
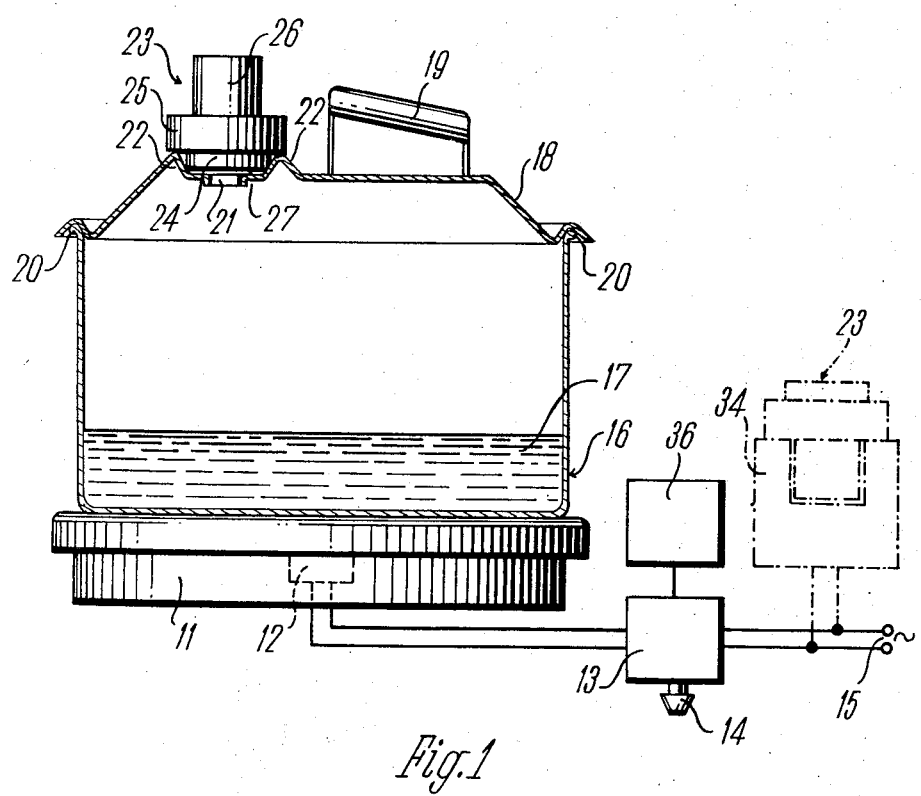

United States Patent [19]
Fischer et al.

[11] 3,828,164
[45] Aug. 6, 1974

[54] COOKING DEVICE WITH AN ELECTRICAL TEMPERATURE CONTROL

[75] Inventors: Karl Fischer, Am Gansberg; Wolfgang Niehaus, both of Oberderdingen, Germany

[73] Assignee: said Fischer, by said Neihaus

[22] Filed: Nov. 21, 1972

[21] Appl. No.: 308,507

[30] Foreign Application Priority Data
Dec. 10, 1971  Germany............................ 2161371

[52] U.S. Cl................. 219/431, 219/432, 219/435, 219/442, 219/490, 320/2
[51] Int. Cl............................................. F27d 11/02
[58] Field of Search ........... 219/401, 431, 432, 435, 219/440, 441, 442, 433, 490, 501, 513; 320/2, 59; 73/362

[56] References Cited
UNITED STATES PATENTS

| | | | |
|---|---|---|---|
| 2,392,077 | 1/1946 | Wilson | 219/431 |
| 2,424,393 | 7/1947 | Graves | 219/431 |
| 2,507,666 | 5/1950 | Goldthwaite | 219/431 |
| 2,543,646 | 2/1951 | Sherman | 219/435 X |
| 2,762,895 | 9/1956 | Throw | 219/401 X |
| 2,771,536 | 11/1956 | Page | 219/431 |
| 2,818,732 | 1/1958 | Bennett | 73/362 R |
| 3,177,319 | 4/1965 | Komatsu | 219/513 X |
| 3,277,358 | 10/1966 | Nicholl | 320/2 X |
| 3,418,552 | 12/1968 | Holmes | 320/2 |
| 3,637,985 | 1/1972 | Stacey | 219/490 |

*Primary Examiner*—Volodymyr Y. Mayewsky
*Attorney, Agent, or Firm*—Brumbaugh, Graves, Donohue & Raymond

[57] ABSTRACT

A regulator for an electric or gas hot plate comprises a freely movable control unit which is fixed to or can be placed upon a pan lid. The control unit includes a battery powered radio transmitter which transmits a signal when steam rises in the pan and is condensed in the control unit, the latter including a thermally responsive switch for switching on the transmitter. The signal is received by a receiver which controls a power switch for the hot plate. The battery can be a rechargeable accumulator which can be re-charged via an inductive coupling and a rectifier.

12 Claims, 4 Drawing Figures

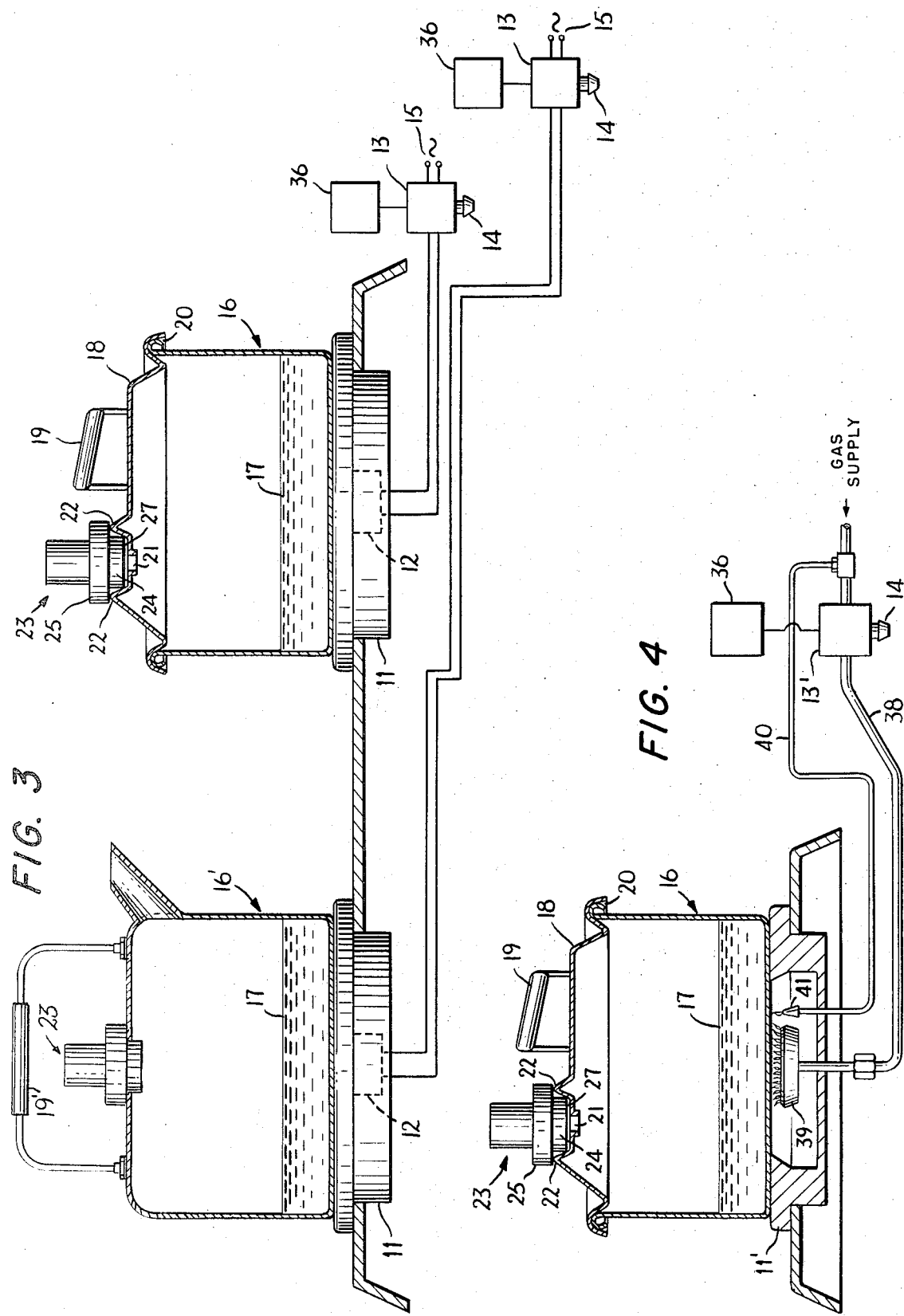

COOKING DEVICE WITH AN ELECTRICAL TEMPERATURE CONTROL

The invention relates to a regulator for controlling the cooking operation in a cooking vessel which may be placed onto a heating element, such as an electric hot plate, which regulator has a temperature-dependent switching element which may be placed onto a cooking vessel and which responds to the heat of condensing steam from the cooking vessel and switches the heating element.

A previously proposed regulator of this kind comprises a sensor box which acts upon an electrical snap switch which controls the supply of current to an electric hot plate. However, the regulator, known under the name "Egomat," had to be connected to the electric hot plate or the cooker by means of an electric cable, so that difficulties were involved in handling the regulator.

Such a regulator is, in itself, the ideal device for regulating an electric hot plate. In most cases of application, electric hot plates are used for heating media containing water. These media should be brought to boiling point as rapidly as possible and then maintained at the boiling temperature as accurately as possible for a more or less long period of time. All other temperature-dependent regulators seek to achieve ideal heating of this kind. However, the difficulty is always that the temperature of the commodity to be cooked cannot be sensed, but only the temperatures of the hot plate or the cooking vessel. However, it is only in specific ideal cases that these temperatures give an accurate indication of the temperature of the commodity to be cooked. The relationship between the temperature sensed and the temperature of the commodity to be cooked depends upon, for example, the quality of the cooking vessel and the quantity and consistency of its contents, even when the temperature is sensed directly from the bottom of the cooking vessel.

Therefore, a feature of the invention is to provide a regulator of the initially mentioned kind which is simple to handle and which renders it possible to regulate the heating element in direct dependence upon the cooking state.

In accordance with the invention, the switching element is connected to a transmitter and an associated source of energy, which transmitter emits a pulse when the switching element is actuated, the switching element, the transmitter and the source of energy are together arranged in a freely movable control unit, and the heating element has an associated switching device controlled by a receiver which receives the pulses from the transmitter.

Thus, the operator has only to place the control unit, which may be in the form of a small, convenient box, onto the cooking vessel, for example, the lid of the cooking vessel, and to switch on the electric hot plate. The latter can then operate with the desired power, for example, to heat water with full power, or to heat a broth with reduced power. For this purpose, the electric hot plate can have an energy regulator or seven-cycle control device. When the commodity to be cooked attains the boiling temperature, the rising steam actuates the switching element, and the transmitter in the control unit supplies a pulse to the receiver which controls the switching device of the electric hot plate in such a manner that the electric hot plate is either switched off or changed over to a lower power for further cooking. The generation of steam then ceases after a short period of time, and the electric hot plate is switched on again.

Thus, in contrast to various temperature-dependent systems, a cooking vessel of different construction, or a different commodity to be cooked, cannot cause the regulator to be switched in such a manner that either the commodity is not brought to the boiling point or the switching temperature of the temperature regulator is somewhat in excess of the boiling point, so that the electric hot plate continues to operate at full power and allows the commodity to boil away.

Figure 2:
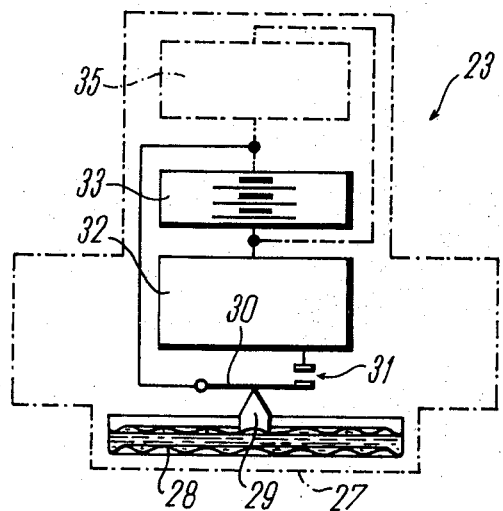

The invention is further described, by way of example, with reference to the accompanying drawings, in which:

FIG. 1 is a diagrammatic illustration of an electric hot plate together with a cooking vessel and regulator in accordance with the invention, FIG. 2 is a circuit diagram of the control unit of the regulator, FIG. 3 is a diagrammatic illustration of a second embodiment of the invention; and FIG. 4 is a diagrammatic illustration of a third embodiment of the invention.

Referring to the drawings, in which like reference numerals designate identical or corresponding parts throughout the several figures, and more particularly to FIG. 1, an electric hot plate 11 has a thermal protective switch 12 which, in a conventional manner, is arranged in the non-heated central zone of the electric hot plate and protects the hot plate against inadmissible overheating. The supply of energy to the electric hot plate is controlled by a switching device 13 having a device 14 for setting the power fed to the electric hot plate. This may be effected by a conventional switch which switches in stages and which is known under the name "seven-cycle switch," or by an energy regulator which feeds the electrical energy to the electric hot plate in the form of individual power pulses. The switching device is connected to a conventional source 15 of current.

A cooking vessel 16 stands on the electric hot plate and is partially filled with a commodity 17 which is to be cooked and which contains water. The cooking vessel 16 has a lid 18 provided with a handle 19. The lid is bulged upwardly in such a manner that it forms a steam dome, i.e., its center region is higher than the gap 20 which, naturally, is formed in the region in which the lid rests on the cooking vessel 16. The high-domed region of the lid 18 has an opening 21 for the passage of steam from the commodity to be cooked. Centering projections 22 are formed upwardly out of the lid and surround the opening 21. A control unit 23 is guided between the centering projections 22.

In the embodiment illustrated, the control unit 23 is a cylindrical, substantially box-shaped device having a guide portion 24, a flanged portion 25, and an upper portion 26. It is not connected to the switching device 13 by any wires and is completely independent and freely movable. Thus, it can be freely placed onto the lid and removed therefrom.

The circuit and the essential construction of the control unit 23 is shown diagrammatically in FIG. 2. The region of the underside 27 of the control unit facing the opening 21 is provided with a bellows 28 which comprises two corrugated diaphragms sealingly interconnected at their edges and which is filled with a fluid, such as alcohol, whose boiling point is slightly below the boiling point of water. The bellows 28 acts by way of a pressure member 29 upon an electrical switch 30 which has a pair 31 of contacts and which is preferably in the form of an electrical snap switch. Furthermore, the control unit 23 accommodates a radio transmitter 32 which needs to have only a very short range and which, consequently, can be of extremely small and simple construction. It is equipped to emit a specific frequency. The transmitter 32 is fed by a source 33 of energy which, in the main embodiment shown in FIG. 2, is in the form of an electrical dry battery which is arranged in the housing of the control unit 23 so as to be interchangeable. The transmitter 32 is fed with the current from the source 33 of energy by way of the switch 30 and its pair 31 of contacts, so that the transmitter is switched on only when the pair 31 of contacts is closed.

Alternatively, the source 33 of energy may be in the form of a rechargeable miniature electric accumulator. In this embodiment, it is advantageous if the accumulator can be charged by a contactless arrangement such that the accumulator is not removed from the control unit. Such an arrangement is indicated by dash-dot lines in the Figures. For this purpose, the source 15 of current is connected to a charging device 34 which is constructed so as to transmit the charging energy to the control unit 23 without direct electrical contact. This is effected inductively in the manner of a transformer whose primary winding is in the device 34 and whose secondary winding is in the unit 23. The control unit 23 accommodates a device 35 which rectifies the current received inductively from the charging device 34 and feeds it to the source 33 of energy which, in the present case, is in the form of an accumulator, the device 35 also serving as a protection against the reverse flow of current. As may be seen from FIG. 1, the charging device 34 may be constructed such that it has a recess into which the upper portion 26 of the control unit 23 is inserted to receive the charging current in a contactless manner, so that the charging device 34 serves to store and charge the control unit.

Furthermore, FIG. 1 shows a radio receiver 36 which is fixedly set to the frequency emitted by the control unit 23 and which feeds a switching pulse to the switching device 13 upon receiving pulses transmitted by the control unit 23.

The regulator in accordance with the invention operates in the following manner:

The electric hot plate 11 is switched on by way of the setting device 14 and, for the purpose of heating water for example, is set to the highest power step. The cooking vessel 16 stands on the electric hot plate, the lid 18 is placed on the cooking vessel, and the control unit 23 is removed from, for example, the charging device 34 and is placed on the lid at the location provided for this purpose.

When the temperature of the bellows 28 is below its fixedly set switching point which may be, for example, 80°C, the transmitter 32 is switched off, since the pair 31 of contacts is open, and the receiver 36 receives no pulses. Thus, a relay (not illustrated) which is provided in the switching device 13, and which is controlled by the output signals of the receiver 36, is closed and the supply of current from the source 15 of current to the electric hot plate 11 continues by way of the protective switch 12 which is also closed.

As soon as the commodity 17 to be cooked commences to boil, steam is formed in the cooking vessel 16 and passes through the opening 21 and is blown onto the bellows 28. Since the lid 18 of the cooking vessel is in the form of a steam dome, it is ensured that the steam escapes through the opening 21 and not through the gap 20. A portion of the steam condenses on the bellows 28 and thus very rapidly heats the fluid contained therein. The fluid also commences to boil and expands the bellows. The switch 30 is thus actuated and the pair 31 of contacts is closed, so that the transmitter 32 receives current from the source 33 of energy and emits its fixedly set frequency. This frequency is received by the transmitter 36 and converted into an output pulse which opens the relay in the switching device 13, so that the electric hot plate is switched off. As already mentioned, the hot plate can be changed over to a lower cooking power instead of being switched off, although owing to the brief and direct action of the control device, this is necessary only in exceptional cases.

Provided that steam is issuing through the opening 21, the transmitter 32 remains switched on and, consequently, the relay in the switching device 13, remains open. It is only when the generating of steam in the cooking vessel 16 ceases that the switch 30 is opened again by renewed contracting of the bellows 28, and the absence of pulses in the receiver 36 leads to renewed closing of the relay and thus to the renewed heating of the hot plate.

It will be appreciated that, in this manner, the hot plate is provided with a regulator which enables a cooked commodity to be obtained in the boiled state with maximum accuracy and only a small amount of "overshooting" or hysteresis. It is advantageous to provide the electric hot plate with the thermal protective switch 12, since, of course, the control unit 23 is not used when roasting, frying, etc., i.e., during working operations in which little or no water is involved, or when a temperature above boiling point is required. The hot plate then operates in the same way as a normal manually controlled electric hot plate, and the thermal protective switch acts as a protection against over-heating. It at the same time provides protection if the control unit is inadvertently not placed on the lid 18 of the cooking pot or if it fails, or if the operator forgets the pot when the electric cooking appliance is switched on. In this case, of course, over-heating occurs only when the commodity to be cooked is fully boiled away, although this might take days owing to the accurate regulating effected by the regulator in accordance with the invention.

Many modifications are possible within the scope of the invention. Thus, for example, the control unit may be fitted in a lid of a cooking vessel or in the cooking vessel itself, this being advantageous for kettles or boilers for example. In the case of a plurality of hot plates equipped with the regulator in accordance with the invention, such as shown in FIG. 3, the frequencies of the associated control units, which are correspondingly marked, by colours, for example, and the frequencies of the associated receivers may be different. It is not essential to arrange the receivers directly on the electric hot plate. They may be accommodated in, for example, an independent housing on the kitchen wall, as well as any charging devices provided. Although the above-described mode of operation, in which the transmitter is switched on only when it is indicated that the commodity is boiling, is advantageous in that the source of energy has to feed the transmitter only during the short periods of time during which the commodity is boiling, it is also possible to provide a modification to meet different requirements. When it is more important to provide the maximum margin of safety against the failure of the transmitter or receiver than to save energy, the arrangement could be such that the supply of energy to the electric hot plate is switched on only when a pulse exists the supply of energy being switched off immediately if the pulse should fail. Although the construction of the switching element 28, 30 is facilitated by filling the bellows with a boiling fluid, it is possible to use a bellows filled with a thermally expansible fluid, or to use an altogether different kind of temperature sensor. Preferably, the control unit is accommodated in a housing which is closed on all sides and which is made entirely from a plastics material with the exception of an opening closed by the diaphragm of the bellows 28, thus providing satisfactory protection against the moisture of the condensing steam. This protection is also promoted by the embodiment having an accumulator to be charged in a contactless manner, since the housing can then be hermetically sealed. Although the principal field of application of the invention is the boiling of water or commodity containing water, it may, with appropriate design, be used for other commodities to be cooked.

Although the preferred use has been described in the specification with reference to an electric hot plate, the regulator in accordance with the invention can be used with other heating elements such as a gas cooking appliance, as shown in FIG. 4. The switching device 13' can then be provided with a solenoid valve or the like to open and close the gas line 38 leading to the burner 39. The switching device 13' does not, of course, interfere with gas flow in the gas line 40 for the burner pilot light 41.

I claim:

1. A controlled cooking device comprising a cooking vessel having closure means for covering the vessel; heating means for heating the cooking vessel; electrically operable switching means for the heating means; a receiver for controlling and electrically operating the switching means; and a control unit adapted to be placed onto the closure means of the cooking vessel so as to respond to the heat of condensing steam from the cooking vessel, said control unit comprising a housing, a transmitter, a source of electrical energy and a temperature responsive switching element for connecting said transmitter to said source whereby the transmitter transmits a signal when the switching element is actuated, said receiver being adapted to receive said signals from said transmitter and, in response thereto, to control said switching means so as to regulate the heating means.

2. A controlled cooking device according to claim 1, in which said transmitter and said temperature responsive switching element are arranged such as to switch on said transmitter when condensing steam is detected by said switching element.

3. A controlled cooking device according to claim 1 in which said temperature responsive switching element comprises a bellows, a thermally expansible fluid in said bellows and an electrical snap switch actuable by said bellows.

4. A controlled cooking device according to claim 3, in which said fluid has the property that it boils slightly below the condensation temperature of steam.

5. A controlled cooking device according to claim 1 in which said source of electrical energy comprises a rechargeable electrical accumulator means and said controlled cooking device further includes charging means for recharging said accumulator means.

6. A controlled cooking device according to claim 5, in which said charging means serves for the storing of said control unit when not in use and in which said charging means and said control unit include contactless electrical power transmitting means.

7. A controlled cooking device as claimed in claim 6 in which said power transmitting means comprises inductive coupling means between said charging means and said control unit.

8. A controlled cooking device according to claim 1, wherein the closure means includes a removable lid for the cooking vessel, said lid having an opening and being adapted to removably receive said control unit so that steam can reach said control unit through said opening.

9. A controlled cooking device according to claim 1, wherein the closure means includes a removable lid for the cooking vessel, said control unit being connected to said lid.

10. A controlled cooking device according to claim 1, wherein the closure means includes a removable lid for the cooking vessel, said control unit being received on said lid and said lid being formed as a steam dome having a highest region in which said control unit is located.

11. A controlled cooking device according to claim 1, in which the heating means includes an electric hot plate provided with a thermal protective switch for protection against over-heating, said hot plate being connected to said switching means.

12. A controlled cooking device according to claim 1, further comprising a plurality of cooking vessels each of which has closure means for covering said vessel, a plurality of heating means, a plurality of control units adapted to be placed onto the closure means of different cooking vessels and having transmitters tuned to transmit signals at different frequencies, a plurality of electrically operable switching means for the individual heating means, and a plurality of receivers for respectively controlling and electrically operating said switching means, said receivers being respectively tuned to said different frequencies.

* * * * *